United States Patent [19]

Matsumoto et al.

[11] 3,879,261

[45] Apr. 22, 1975

[54] PROCESS FOR PRODUCTION OF YEAST CELLS FROM BUTANOLS

[75] Inventors: Shun-ichi Matsumoto, Kamakura; Eiji Sato, Zushi, both of Japan

[73] Assignee: Toray Industries, Inc., Tokyo, Japan

[22] Filed: Jan. 31, 1974

[21] Appl. No.: 438,390

[30] Foreign Application Priority Data
Feb. 2, 1973  Japan.............................. 48-20237
Apr. 11, 1973  Japan.............................. 48-40371

[52] U.S. Cl.................. 195/49; 195/28 R; 195/82
[51] Int. Cl............................................. C12b 1/00
[58] Field of Search .......... 195/49, 82, 28 R; 51/75

[56] References Cited
FOREIGN PATENTS OR APPLICATIONS
1,210,770  10/1970  United Kingdom.................. 195/49

*Primary Examiner*—Lionel M. Shapiro
*Assistant Examiner*—R. B. Penland

[57] ABSTRACT

Method for producing yeast cells by growing a yeast strain in a culture medium containing a normal and/or secondary butanol.

11 Claims, No Drawings

PROCESS FOR PRODUCTION OF YEAST CELLS FROM BUTANOLS

DESCRIPTION OF THE PRIOR ART

Commercial production of yeast cells from normal paraffin has been realized in some countries, and utilization of the products as feed has been developing. Various strains of yeast have been reported which can assimilate methanol, ethanol, acetic acid and the like as their main carbon source, and some of these strains are expected to be used for production of yeast cells.

S. Omata et al. investigated the capability of various yeast strains for assimilating lower alcohols. They reported in Journal of the Fermentation Association, Japan, vol. 26, page 313 to 316 (1968), that none of the yeast strains tested by them actually utilized secondary butanol while only a few utilized normal butanol.

We now have found new species of yeast strains which have the capability of growing by assimilating normal and/or secondary butanol as their main carbon source, with a possibility of producing yeast cells from these butanols.

DESCRIPTION OF THE PREFERRED EMBODIMENTS

In accordance with this invention, yeast cells can be produced employing yeast strains belonging to genera Candida and Trichosporon and utilizing normal and/or secondary butanol as the main carbon source. N- and sec-butanol used in this invention can be obtained economically by hydrating $C_4$-olefins which are by-products of the hydrocarbon-cracking process for preparing ethylene.

The yeast strains which may be employed according to the present invention are strains of the genera Candida or Trichosporon. Typical examples of the strains belonging to these genera and having ability to assimilate n- and/or secbutanol are as follows:

Yeast species assimilating both normal and secondary butanols

Candida butanolphila nov. sp. FERM-P 1882
  Candida butanolytica nov. sp. FERM-P 1883
  Candida alcophila nov. sp. FERM-P 1884
  Trichosporon butano philum nov. sp. FERM-P 1885
  Trichosporon alcophilum nov. sp. FERM-P 1886

Yeast species assimilating only normal butanol

Candida spherica nov. sp. FERM-P 1911
  Candida ellipsis nov. sp. FERM-P 1908
  Candida splitica nov. sp. FERM-P 1909
  Trichosporon opalum nov. sp. FERM-P 1910

These species were classified with respect to their genera, and were confirmed to be novel species on the basis of their taxonomic characteristics mentioned below:

Taxonomic Characteristics a. The growing properties of the vegetative cells in various media are reported in Table I which appears hereinafter.

b. Production of ascospore:
   Absent for all species on Gorodkwa agar and gypsum block (at 30° C, for 7 days).

c. Production of ballistospore:
   Absent for all species on Malt-Yeast extract agar.

d. Physiological properties are reported in Table II which appears hereinafter.

e. Assimilation of various carbon sources. This is reported in Table III which appears hereinafter.

f. Fermentation of sugars. This is reported in Table IV which appears hereinafter.

TABLE I.—GROWING PROPERTIES OF VEGETATIVE CELLS IN VARIOUS MEDIA

| Medium and condition | Observation of growth | FERM-P 1882, C. Butanophila | FERM-P 1883, C. Butanolytica | FERM-P 1884, C. Alcophila | FERM-P 1911, C. Spherica | FERM-P 1908, C. Ellipsis | FERM-P 1909, C. Splitica | FERM-P 1885, T. Butanophilum | FERM-P 1886, T. Alcophilum | FERM-P 1910, T. Opalum |
|---|---|---|---|---|---|---|---|---|---|---|
| Malt-yeast extract medium—Peptone, 5 g.; Yeast extract, 3 g.; Malt extract, 3 g.; D-glucose, 10 g.; Dist. water, 1,000 ml. (30° C., 2-7 days). | 1. Shape | Oval or long oval (3-8μ) x (8-14μ) | Cylindrical (2-5μ) x (7-15μ) | Short-oval (2-6μ) x (5-8μ) | Spherical (5-10μ) | Oval (2-5μ) x (3-7μ) | Long oval (2-5μ) x (5-15μ) | Oval (8-12μ) x (10-20μ) | Oval (7-14μ) x (10-20μ) | Oval (2-5μ) x (3-8μ) |
| | 2. Size | | | | | | | | | |
| | 3. Vegetative reproduction | Budding | Budding | Budding | Budding | Budding | Budding | Budding | Budding | Budding |
| | 4. Pellicle | Thin and smooth pellicle, creeping ring formation | Thin and smooth pellicle, creeping ring formation | Thin and smooth pellicle | Heavy and thick pellicle | Ring formation | Heavy and thick pellicle | Thin and smooth pellicle, creeping ring formation | Thin pellicle, creeping ring formation | Pellicle formation |
| | 5. Production of gas | Absent | Absent | Absent | Absent | Absent | Absent | Absent | Absent | Absent |
| | 6. Turbidity of medium | Slight | Moderate | Moderate | Absent | Moderate | Moderate | Slight | do | Moderate |
| | 7. Sediment formation | Compact sediment | Compact and block sediment | Compact and block sediment | Compact sediment | Block sediment | Flaky and compact sediment | Block sediment | Block sediment | Block sediment |
| | 8. Color of medium | No change | No change | No change | No change | No change | No change | No change | No change | No change |

TABLE I.—GROWING PROPERTIES OF VEGETATIVE CELLS IN VARIOUS MEDIA—Continued

| Medium and condition | Observation of growth | FERM-P 1882, C. Butanophila | FERM-P 1883, C. Butanolytica | FERM-P 1884, C. Alcophila | FERM-P 1911, C. Spherica | FERM-P 1908, C. Ellipsis | FERM-P 1909, C. Spilitica | FERM-P 1885, T. Butanophilum | FERM-P 1886, T. Alcophilum | FERM-P 1910, T. Opalum |
|---|---|---|---|---|---|---|---|---|---|---|
| Malt-yeast extract agar—Peptone, 5 g.; Yeast extract, 3 g.; Malt extract, 3 g.; D-glucose, 10 g.; Agar, 15 g.; Dist. water, 1,000 ml. (25° C., 7-10 days). | 1. Growth | Abundant | Abundant | Abundant | Abundant | Abundant | Abundant | Abundant | Abundant | Abundant. |
| | 2. Colony— | | | | | | | | | |
| | (a) Shape | Irregular round | Irregular round | Irregular round | Irregular round | Round | Irregular round | Round | Round | Irregular round. |
| | (b) Edge | Filamentous | Filamentous | Filamentous | Filamentous | Entire | Filamentous | Erose | Entire | Erose. |
| | (c) Surface | Radially rugose | Radially rugose | Radially rugose | Radially rugose | Smooth | Radially rugose | Granular | Rough | Rough. |
| | (d) Shape of vertical section | Umbonate | Umbonate | Umbonate | Pulvinate | Raised | Umbonate | Raised | Convex | Flat. |
| | (e) Brightness | Dull | Dull | Absent | Absent | Shiny | Absent | Absent | Absent | Absent. |
| | (f) Color | Milky white, slightly greyish | Milky white, slightly greyish | Milky white, slightly greyish | Milky white, slightly greyish | Milky white | Milky white | Milky white, slightly greyish | Milky white, slightly greyish | Milky white. |
| Potato agar (slide culture)—Fresh potato, 100 g.; D-glucose, 20 g.; Agar, 20 g.; Dist. water, 1,000 ml. (30° C., 3 days). | 1. True mycelium | Developed | Developed | Developed | Developed | Not formed | Developed | Not formed | Not formed | Not formed. |
| | 2. Pseudo mycelium | do | do | do | do | Developed | do | do | do | Do. |
| | 3. Chlamydospore | Not formed | Not formed | Not formed | Not formed | Not formed | Not formed | do | do | Do. |
| | 4. Blastspore | do | do | do | do | Partially formed | do | do | do | Do. |
| | 5. Arthrospore | do | do | do | do | Not formed | Partially formed | Developed | Developed | Developed. |
| | 6. Morphological properties | Special type mycelium as fern is developed | Special type mycelium as fern is developed | Special type mycelium as fern is developed | | | | Special type mycelium as fern is developed | | Arthrospores abundantly formed. |

Table II

| | Physiological Properties | | | | | | | | |
|---|---|---|---|---|---|---|---|---|---|
| FERM Number | FERM-P 1882 | FERM-P 1883 | FERM-P 1884 | FERM-P 1911 | FERM-P 1908 | FERM-P 1909 | FERM-P 1885 | FERM-P 1886 | FERM-P 1910 |
| Name of Species | C. butano-phila | C.butano-lytica | C.alcophila | C. spherica | C.ellipsis | C.splitica | T. butano-philum | T.alco-philum | T.opalum |
| Optimum growing condition pH | 3.0–7.0 | 3.0–7.0 | 3.0–7.0 | 3.0–7.0 | 3.0–7.0 | 3.0–7.0 | 3.0–7.0 | 3.0–7.0 | 3.0–7.0 |
| temp. | 20–35° C | 20–35° C | 20–35° C | 20–36° C | 20–36° C | 20–36° C | 20–35° C | 20–35° C | 20–36° C |
| Limit of growth pH | scanty growth at pH 7.8 | scanty growth at pH 7.8 | scanty growth at pH 7.8 | scanty growth at pH 7.8 | scanty growth at pH 7.8 | scanty growth at pH 7.8 | scanty growth at pH 7.8 | scanty growth at pH 7.8 | scanty growth at pH 7.8 |
| temp. | scanty growth at 40°C | scanty growth at 40°C | scanty growth at 40°C | scanty growth at 42°C | scanty growth at 42°C | scanty growth at 42°C | scanty growth at 40°C | scanty growth at 40°C | scanty growth at 42°C |
| Assimilation of potassium nitrate | absent | absent | absent | absent | absent | absent | absent | absent | absent |
| Splitting of arbutin | absent | absent | absent | observed | absent | observed | absent | absent | absent |
| Ethanol as sole source of carbon | abundant growth | abundant growth | abundant growth | abundant growth | abundant growth | abundant growth | abundant growth | abundant growth | abundant growth |
| Action in litmus milk | no change | no change | no change | yellow and solidification | no change | yellow and solidification | no change | no change | no change |
| Urease test | + | + | + | + | + | + | + | + | + |
| Production of carotenoid pigment | absent | absent | absent | absent | absent | absent | absent | absent | absent |
| Production of starch-like compounds | absent | absent | absent | observed | absent | observed | absent | absent | absent |
| Vitamin requirements | ± | ± | ± | ± | ± | + | ± | ± | + |
| Production of organic acid | absent | absent | absent | absent | absent | absent | absent | absent | absent |
| Limit condition of growth in NaCl solution | 10% | 10% | 10% | 10% | 10% | 10% | 10% | 10% | 10% |
| Butanol as sole source of carbon | (sec-) abundant growth | (sec-) abundant growth | (sec-) abundant growth | (n-) abundant growth | (n-) abundant growth | (n-) abundant growth | (sec-) abundant growth | (sec-) abundant growth | (n-) abundant growth |
| Gelatin liquefaction | absent | absent | absent | observed | observed | observed | absent | absent | observed |

Table III

| | Assimilation of various carbon sources | | | | | | | | |
|---|---|---|---|---|---|---|---|---|---|
| Yeast species / Carbon sources | FERM-P 1882 C.butano-phila | FERM-P 1883 C.butano-lytica | FERM-P 1884 C.alcophila | FERM-P 1911 C.spherica | FERM-P 1908 C.ellipsis | FERM-P 1909 C.splitica | FERM-P 1885 T.butano-philum | FERM-P 1886 T.alco-philum | FERM-P 1910 T.opalum |
| D-glucose | + | + | + | + | + | + | + | + | + |
| D-galactose | + | + | + | + | + | + | ± | − | + |
| Sucrose | − | − | − | + | − | + | − | + | − |
| Maltose | − | − | − | + | − | + | − | + | − |
| Lactose | − | − | − | + | − | + | − | + | − |
| Raffinose | − | − | − | + | − | + | − | − | − |
| Esculin | − | − | − | − | − | − | − | − | − |
| Inulin | − | − | − | − | − | − | − | − | − |
| Dextrin | − | − | − | + | − | + | − | − | − |
| Melibiose | − | − | − | + | − | + | − | − | − |
| D-arabinose | − | − | − | − | − | − | − | − | − |
| Soluble starch | − | − | − | + | − | + | − | − | − |
| Trehalose | − | − | − | + | − | + | − | − | − |
| D-Mannose | + | + | + | + | + | + | + | + | + |
| α-Methyl-D-glucose | − | − | − | + | − | + | − | − | − |
| D-Xylose | − | − | − | + | + | + | − | − | + |

Table IV

Fermentation of Sugars

| Sugars | Yeast species | FERM-P 1882 C.butanophila | FERM-P 1883 C.butanolytica | FERM-P 1884 C.alcophila | FERM-P 1911 C.spherica | FERM-P 1908 C.ellipsis | FERM-P 1909 C.splitica | FERM-P 1885 T.butanophilum | FERM-P 1886 T.alcophilum | FERM-P 1910 T.opalum |
|---|---|---|---|---|---|---|---|---|---|---|
| D-glucose | | − | − | − | + | − | − | − | − | − |
| D-galactose | | − | − | − | − | − | − | − | − | − |
| Sucrose | | − | − | − | ± | − | − | − | − | − |
| Maltose | | − | − | − | − | − | − | − | − | − |
| Lactose | | − | − | − | − | − | − | − | − | − |
| Raffinose | | − | − | − | + | − | − | − | − | − |

Six species of the yeasts cited above (FERM-P 1882, 1883, 1884, 1911, 1909 and 1910) do not form ascospores, ballistospores or arthrospores. Their vegetative cells are oval or cylindrical with some variations in size. They reproduce by budding and form true or pseudomycelia. Carotinoid pigment is not produced.

Thus it is appropriate to consider these species as Candida on the basis of the description in "The Yeasts, a Taxonomic Study" by J. Lodder and N. W. J. Kreger - Van Rij (1952).

On comparison of morphological and physiological characteristics of FERM-P 1882, 1883 and 1884 (C. butanophila, C. butanolytica and C. alcophila) with those of the described species of Candida, they are similar to C. rugosa in the properties of fermentation and assimilation of sugars. However, they differ considerably from C. rugosa in terms of ethanol assimilation, action on litmus milk and the absence of long cylindrical cells.

FERM-P 1911 (C. spherica) is similar to C. solani, C. guilliermoudii and C. molibiosi in the properties of fermentation and assimilation of sugars. But FERM-P 1911 differs from these described species in assimilation of lactose, action in litmus milk, and shape of vegetative cell.

FERM-P 1908 (C. ellipsis) is similar to C. rugosa in the properties of fermentation and assimilation of sugars. However, FERM-P 1908 differs from this described species in assimilation of ethanol, action on litmus milk and shape of vegetative cell.

FERM-P 1909 (C. splitica) is similar to C. humicola and C. curvata in terms of no fermentation of sugars, and assimilation of D-glucose, D-galactose, saccharose and maltose. But FERM-P 1909 differs from C. humicola in assimilation of ethanol, and morphology of pseudomycelium, and C. curvata in shape of vegetative cell and splitting of arbutin.

Three species cited above, FERM-P 1885, 1886 and 1910 identified as the genus Trichosporon on the following grounds. These species neither form ascospores nor ballistospores. They form arthrospores. The vegetative cells are oval and reproduce by budding. Carotinoid pigment is not formed.

FERM-P 1885 (T. butanophilum) resembles T. sericeum and T. capitatum in terms of sugars fermentation and assimilations of glucose and galactose. But FERM-P 1885 is distinguished from T. sericeum by nitrate assimilation and true mycelium formation on potato agar. T. capitatum is not identical with it in respect of ethanol assimilation and some morphological characteristics.

FERM-P 1886 (T. alcophilum) is similar to T. cutaneum in terms of fermentation and assimilation of sugars. But they are not identical in assimilation of galactose and ethanol and in the shape of vegetative cells.

FERM-P 1910 (T. opalum) resembles T. sericeum and T. capitatum in fermentation of sugars and assimilation of D-glucose and D-galactose. But FERM-P 1910 is distinguished from the described yeasts in morphology of true mycelium.

From these grounds, we have concluded that these yeasts should be titled as new species and have named them as mentioned above.

In the production of yeast cells, one of the yeast strains may be grown in a medium containing normal and/or secondary butanol as the main carbon source, nitrogen compounds, nutrient salts and growth-promoting materials. Regarding the composition of the culture medium, one of either synthetic or natural origin can be used so long as it contains the above mentioned materials.

The concentration of normal and/or secondary butanol in the medium should be carefully determined. If the concentration is too high, inhibition of growth of the yeast would result. Furthermore loss of butanols into exhaust gas becomes greater. For this reason, butanols are preferably added to the culture medium stepwise or continuously during the time of fermentation, so as to maintain an appropriate concentration.

In addition to normal and/or secondary butanols, utilizable carbon sources such as sugars or alcohols can be added to the culture medium in order to promote the growth of yeast strains.

Nitrogen source of the medium can be selected deliberately from nitrogen containing materials utilizable by the yeast. Usually, good results are obtained when ammonia, urea or ammonium salts such as ammonium chloride, ammonium sulfate or ammonium phosphate are used as a nitrogen source, in a concentration between about 0.1 – 4%.

Regarding the matter of ingredients other than carbon and nitrogen sources, nutrient salts and growth-promoting materials which include all or some of such compounds as potassium phosphate, magnesium sulphate, compounds containing iron, manganese, zinc and other minerals, vitamins, amino acids and nucleotides, can be added.

The yeasts are grown under submerged aerobic conditions for about 1 – 3 days at a temperature from about 20° to 30° C. The pH of the growth medium is preferably maintained between about 3 and 7. Owing to production of organic acids from butanols and/or consumption of ammonium ions in the culture medium, decrease of pH may occur. To keep the pH of the medium within a desirable range, it is necessary either to add calcium carbonate or a buffer solution, or to titrate it during the course of culture with an ammonia or alkali solution.

When the culture is terminated, the yeast cells can be harvested from the culture medium either by filtration or centrifugation. The cells are washed and dried to produce the final crop.

The invention will be described in further detail with reference to the following examples.

EXAMPLE 1

A medium consisting of $KH_2PO_4$ 0.02% (w/v), $K_2HPO_4$ 0.12% (w/v), $MgSO_4.7H_2O$ 0.05% (w/v), $(NH_4)_2SO_4$ 0.3% (w/v) and yeast extract (Difco Laboratories) 0.3% was dispensed, in a 50 ml amount, into three Sakaguchi culture flasks (500 ml) and sterilized by autoclaving at 120°C for 15 minutes. After the medium was cooled, secondary butanol was added to each flask to give a final concentration of secondary butanol of 0.5% (w/v). The pH of the medium was 6.0 before and after sterilization.

FERM-P 1882 (C. butanophila), FERM-P 1883 (C. butanolytica) and FERM-P 1884 (C. alcophila) were individually inoculated into separate flasks and grown with shaking at 30°C.

The concentration of secondary butanol in the culture medium was determined by gas chromatography. Within 18 hours of culture, secondary butanol in the culture medium was consumed nearly completely. Then, sec-butanol was added to 0.5% (v/v). This process was repeated five times to obtain a high density of the cells. The pH of the medium during culture was maintained between 4 and 6 by titrating with 10% ammonia. The yeast cells were harvested by centrifugation, washed with water and dried in vacuo. The yields of dry cells were 14.0 g/l-broth for FERM-P 1882 (C. butanophila), 10.0 g/l-broth for FERM-P 1883 (C. butanolytica) and 12 g/l-broth for FERM-P 1884 (C. alcophila). The rate of propagation of these yeasts in the media were 2.5, 2.9 and 3.2 hours of doubling time respectively. Data regarding elemental analysis of dried cells of these yeasts are shown in Table 4.

EXAMPLE 2

FERM-P 1885 (T. butanophilum) and FERM-P 1886 (T. alcophilum) were individually inoculated into separate flasks containing the same medium as used in Example 1 and culturing was carried out similarly. The consumption of secondary butanol in the medium was complete within 20 – 24 hours. Secondary butanol was added 6 times to give 0.5% (v/v) of butanol concentration at each addition. The cells were harvested, washed and dried. The yield of dried cells (g/l-broth) was 10.0 for FERM-P 1885 (T. butanophilum) and 8.0 for FERM-P 1886 (T. alchophilum). The rates of propagation of these yeasts were 2.8 and 3.2 hours of doubling time, respectively. Data regarding elemental analysis of the dried cells are shown in Table 4.

Table 4

|  | Carbon (%) | Hydrogen (%) | Nitrogen (%) |
|---|---|---|---|
| FERM-P 1882 C. butanophila | 46.9 | 6.5 | 7.5 |
| FERM-P 1883 C. butanolytica | 45.3 | 6.7 | 5.2 |
| FERM-P 1884 C. alcophila | 46.1 | 6.9 | 6.7 |
| FERM-P 1885 T. butanophilum | 46.5 | 6.9 | 6.7 |
| FERM-P 1886 T. alcophilum | 45.0 | 6.8 | 6.5 |

EXAMPLE 3

To the medium prepared in Example 1 was added normal butanol to give final concentration of 0.5% (weight by volume).

Six species of Candida and three species of Trichosporon cited in Table 5 were individually inoculated into separate flasks, and cultured with shaking at 30°C for 24 hours.

Yeast cells were harvested and treated in the same manner as Example 1. The yield of cells are shown in Table 5.

Table 5

| FERM Number | Name of yeast species | Yield g/l-broth |
|---|---|---|
| 1882 | C. butanophila | 1.0 |
| 1883 | C. butanolytica | 1.1 |
| 1884 | C. alcophila | 0.9 |
| 1911 | C. spherica | 1.1 |
| 1908 | C. ellipsis | 0.8 |
| 1909 | C. splitica | 0.9 |
| 1885 | T. butanophilum | 1.1 |
| 1886 | T. alcophilum | 1.2 |
| 1910 | T. opalum | 0.7 |

The following is claimed:

1. A process for preparing yeast cells which comprises growing at least one yeast strain belonging to a genus selected from the group consisting of genera Candida and Trichosporon in a culture medium containing at least one butanol selected from the group consisting of normal and secondary butanol, and harvesting the yeast cells.

2. The process according to claim 1 wherein the yeast strain is FERM-P 1882 (Candida butanophila).

3. The process according to claim 1 wherein the yeast strain is FERM-P 1883 (Candida butanolytica).

4. The process according to claim 1 wherein the yeast strain is FERM-P 1884 (Candida butanophila).

5. The process according to claim 1 wherein the yeast strain is FERM-P 1885 (Trichosporon butanophilum).

6. The process according to claim 1 wherein the yeast strain is FERM-P 1886 (Trichosporon alcophilum).

7. The process according to claim 1 wherein the butanol is normal butanol and the yeast strain is FERM-P 1911 (Candida spherica).

8. The process according to claim 1 wherein the butanol is normal butanol and the yeast strain is FERM-P 1908 (Candida ellipsis).

9. The process according to claim 1 wherein the butanol is normal butanol and the yeast strain is FERM-P 1909 (Candida splitica).

10. The process according to claim 1 wherein the butanol is normal butanol and the yeast strain is FERM-P 1910 (Trichosporon opalum).

11. The process according to claim 1 wherein the butanol is prepared by hydrating $C_4$-olefins obtained from the products of hydrocarbon cracking.

* * * * *